Nov. 19, 1946.     T. R. FOLSOM     2,411,152
METHOD FOR FREEZING AND DRYING LIQUIDS AND SEMI-SOLIDS
Filed May 2, 1941     6 Sheets-Sheet 1
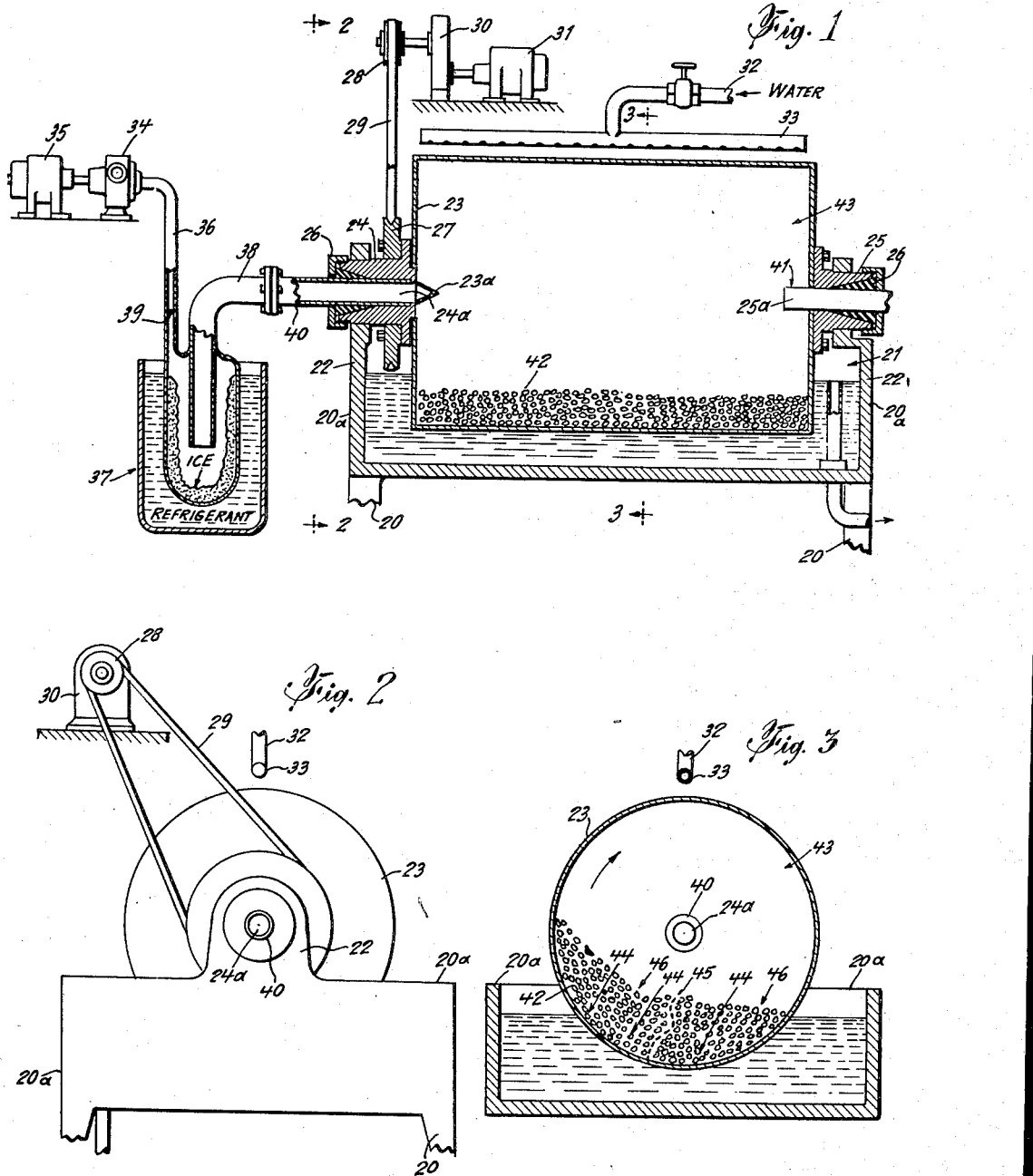
INVENTOR.
T. R. FOLSOM
BY J. Ledermann
ATTORNEY Nov. 19, 1946.    T. R. FOLSOM    2,411,152
METHOD FOR FREEZING AND DRYING LIQUIDS AND SEMI-SOLIDS
Filed May 2, 1941    6 Sheets-Sheet 2
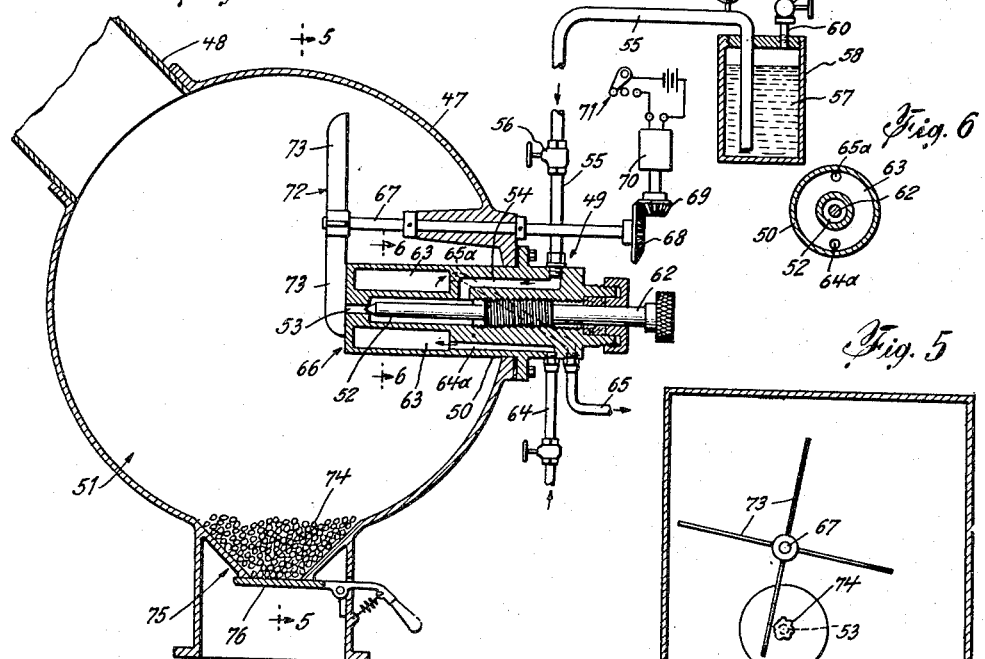
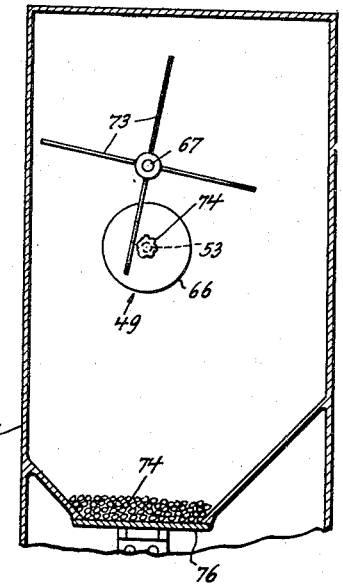
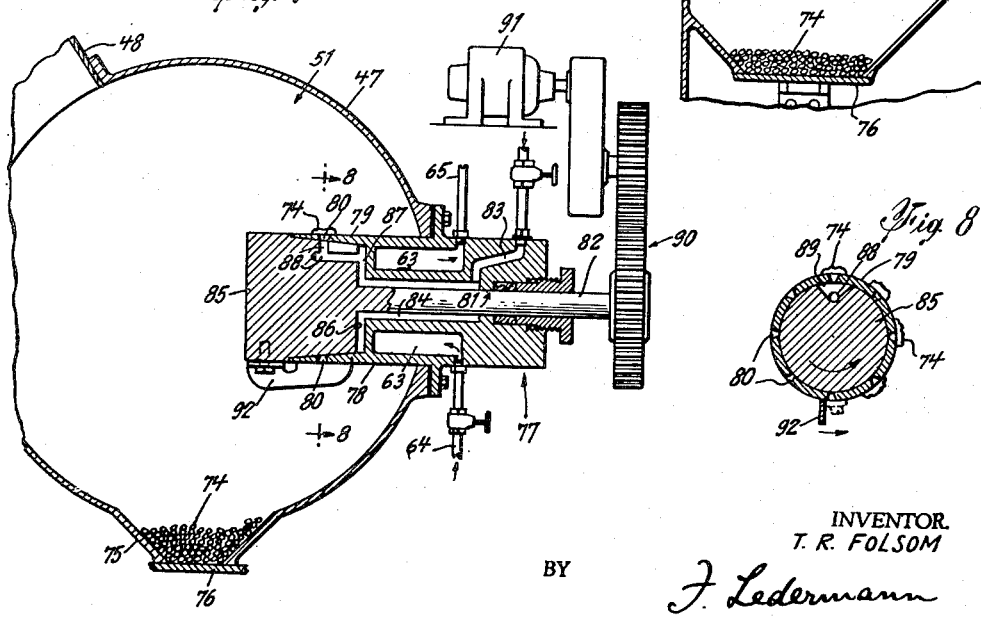
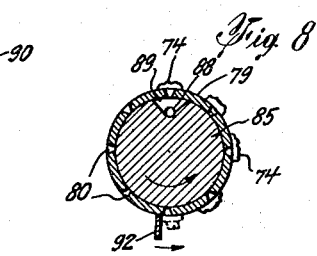
INVENTOR.
T. R. FOLSOM
BY
F. Ledermann
ATTORNEY Nov. 19, 1946.  T. R. FOLSOM  2,411,152
METHOD FOR FREEZING AND DRYING LIQUIDS AND SEMI-SOLIDS
Filed May 2, 1941  6 Sheets-Sheet 3
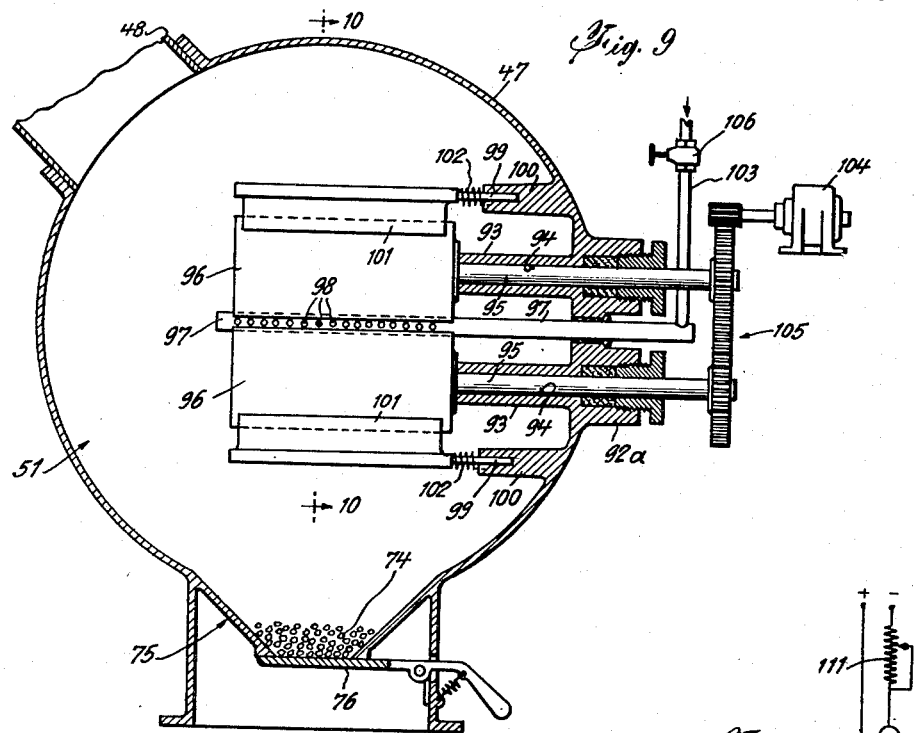
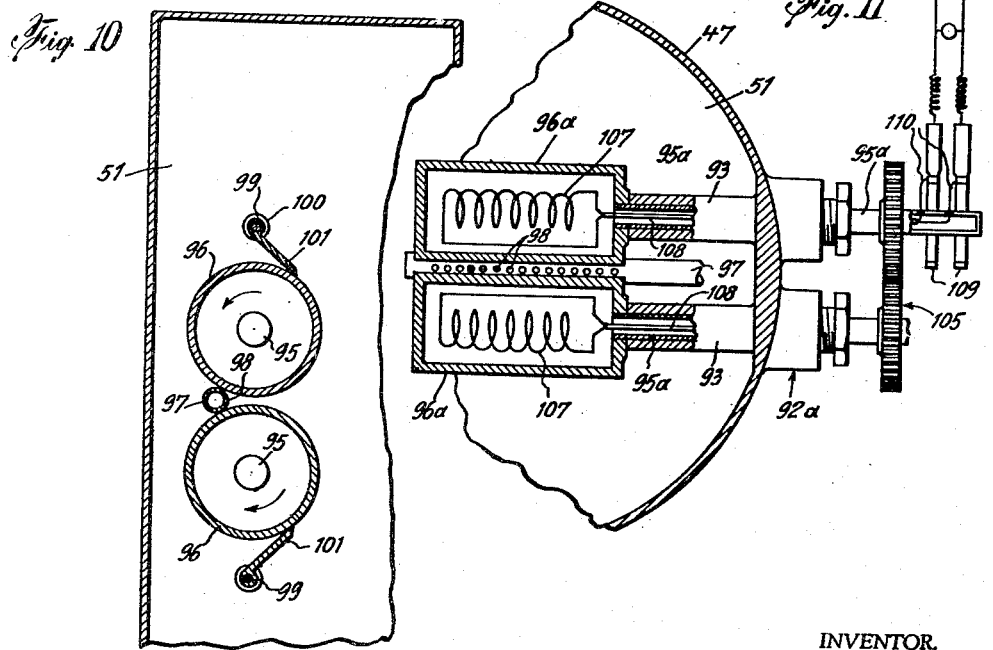
INVENTOR.
T. R. FOLSOM
BY
*J. Ledermann*
ATTORNEY

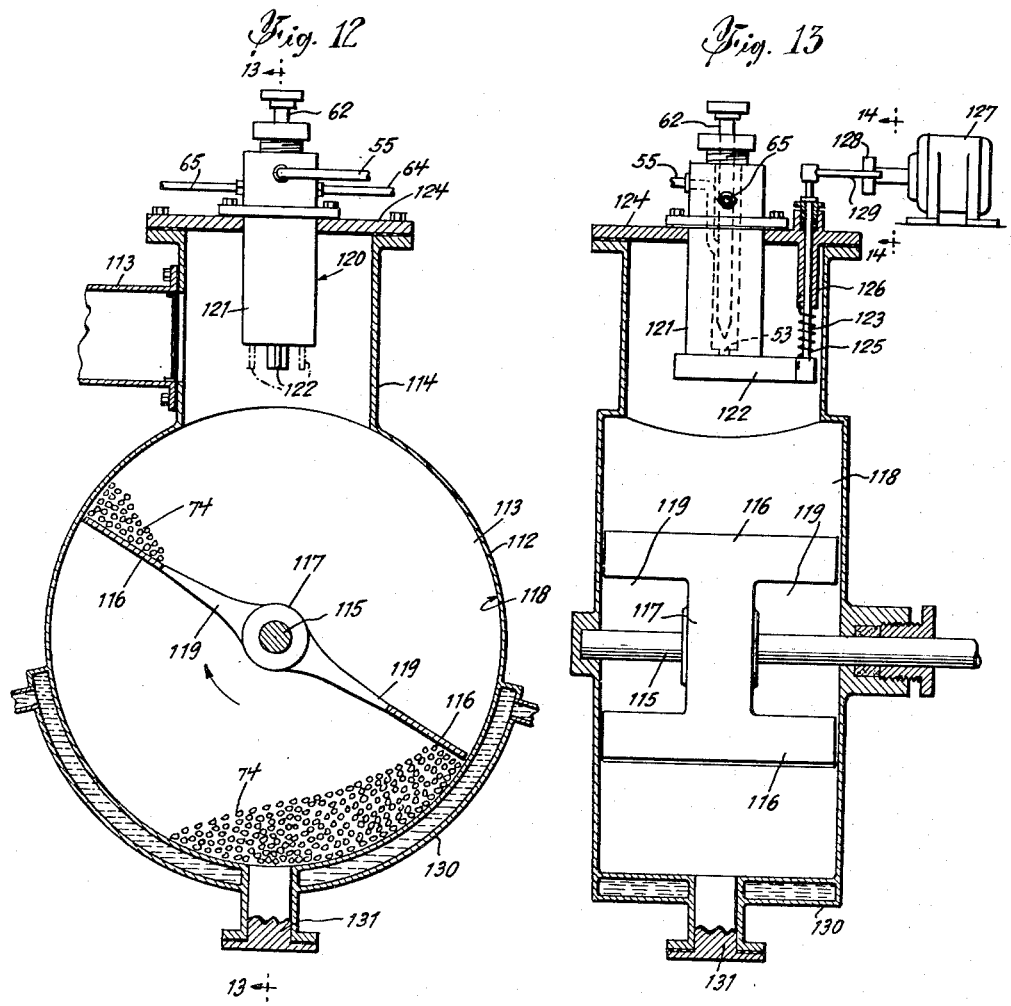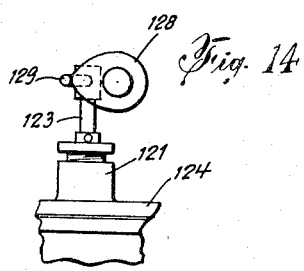

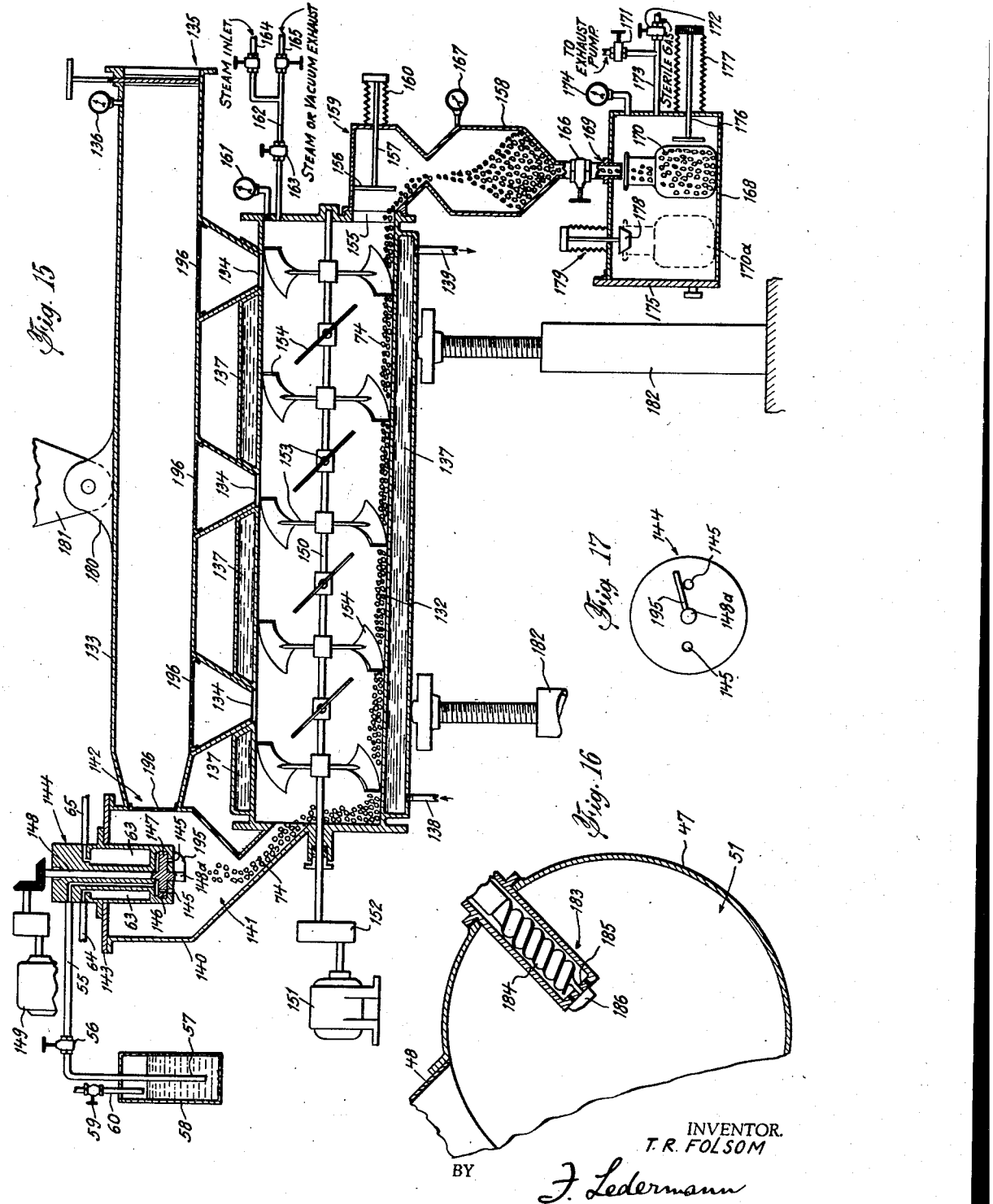

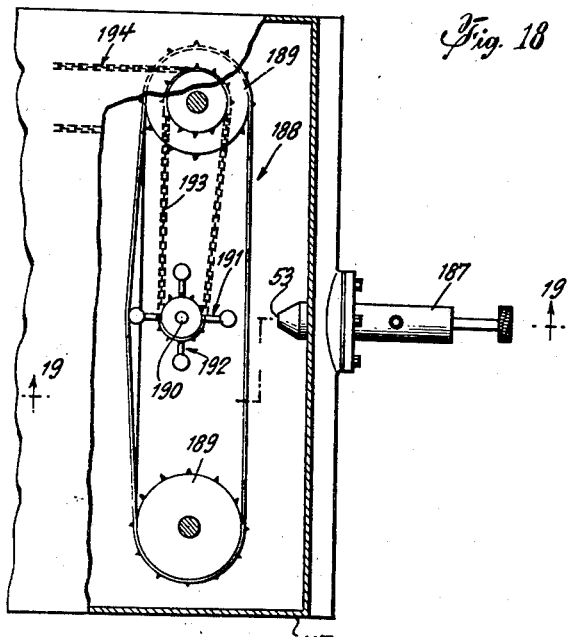
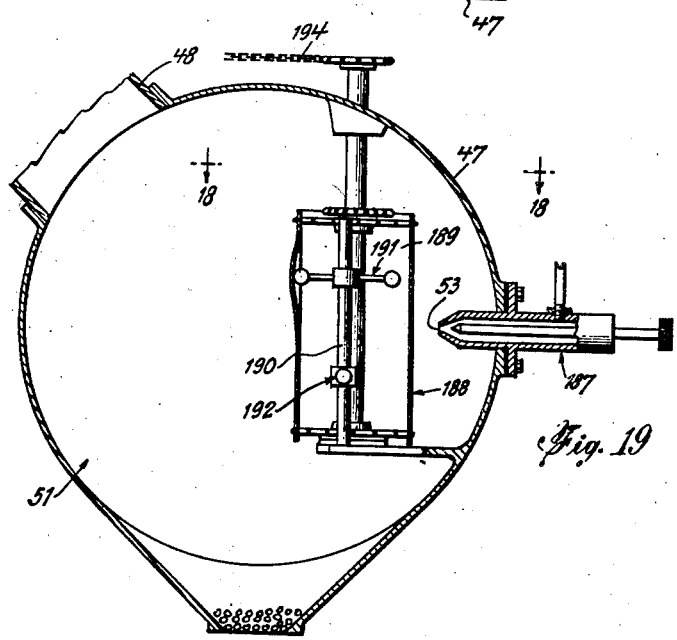

Patented Nov. 19, 1946

2,411,152

UNITED STATES PATENT OFFICE 2,411,152

METHOD FOR FREEZING AND DRYING LIQUIDS AND SEMISOLIDS

Theodore R. Folsom, New York, N. Y.

Application May 2, 1941, Serial No. 391,561

21 Claims. (Cl. 83—91)

This invention relates to methods for removing volatile components (such as water) from a liquid or semi-solid product at low temperature, and more particularly to improved methods which make partial use of vacuum sublimation to remove at least a part of the volatile components present.

The invention aims to provide a more effective method for removing part or all of the volatile components of delicate substances which will not tolerate high temperatures, as for example, biological products such as serum and plasma, as well as other liquids and semi-solids. More particularly, the improvements permit more rapid removal of the volatile components of such products, permit the production of a superior and more useful final product, and further permit the drying process to be more effectively carried out in a continuous or a semi-continuous manner under sterile conditions.

Older methods for removing water from a product in the frozen state are extremely slow, as well as awkward and inefficient. The present invention permits products to be desiccated from the frozen state rapidly, efficiently, and conveniently, in a continuous manner, either in small quantities or in extremely large quantities. The invention also provides a more effective, rapid, and convenient means for converting a liquid or semi-solid into a suitable frozen state for further processing while in the frozen state.

Older methods devised to desiccate biological products at low temperature have several physical limitations which the present invention overcomes. The outstanding limitation of the older methods is the lack of convenient speed and capacity when very low temperatures, especially those below the freezing temperature of the product, are maintained. It has been known that it is advantageous to remove at least the last traces of water from the product while the latter is maintained in the frozen state. It has also been known that the final product is more soluble when the product is kept frozen while the last traces of water are removed. However, experience has shown that vacuum sublimation carried out in the older manner is awkward and slow. Conventionally, the product is frozen in large masses and then exposed in a vacuum, and the vapor is removed by a pumping system.

The method of exposing large masses of frozen substance to vacuum for the purpose of removal of volatiles has three main disadvantages or limitations: (1) The sublimation process is very slow because "heat of sublimation" cannot readily and safely be made available. (2) The large mass of ice dries into bulky slabs or chunks not easily handled or transferred into more suitable final containers. (3) The whole process is not only slow but cannot readily be carried out in a direct and continuous manner from the original liquid or semi-solid product to the final packaged dried product. A more detailed discussion of these three limitations follows.

(1) A great deal of heat energy is required to convert a volatile product which is in the frozen state, into a vapor state. The older methods failed to supply this heat rapidly while maintaining the frozen condition of the product. When frozen in a large slab, and exposed to a vacuum, the product generally shrinks away from the walls of the vessel containing it so that a vacuum gap forms between the product and the wall. This produces a condition of high but erratic thermal insulation to be set up between the mass of and the frozen product and the wall. Furthermore, as the volatile component was gradually lost from the mass the latter became more and more porous, filled with vacuoles, and became less and less conductant throughout. The older methods were content with warming the outer walls of the evacuated vessel containing the large frozen mass or relatively large frozen chunks of the frozen product. Since the temperature at the wall could not be maintained high for fear of damaging the product, and since the thermal conductivity was very poor, the heat actually flowed into the frozen mass very slowly. For example: somewhat over 600 calories are required to sublimate to dryness one gram of frozen blood plasma; the highest permissible temperature of the walls is about 40 degrees C. In sublimating the volume from a clinically useful volume of plasma, say 500 c. c., after having frozen it in a slab, the thermal conductivity frequently met with is so poor that 24–48 hours drying time is often required.

The thermal conductivity limitation is difficult to combat in older methods. With them the vapor cannot be produced as fast as it can be pumped away with a well constructed vapor pumping system. In all this discussion it is presupposed that adequate pumping has been provided or else this too will be a limitation. Experience with older methods has shown that it is easier to arrange for adequate pumping speed than to adequately provide a source of safe heat capable of rapidly freeing vapor from the frozen substance while keeping it frozen. One phase of the present invention concerns this latter problem mainly.

(2) Awkwardness and inefficiency result when the size and shape of the frozen mass being processed is not under suitable control. During the sublimation the rate of escape of vapor from a given substance depends upon two factors, (a) the temperature of the frozen product, (b) the area exposed to vacuum space. As explained above, heat flows very slowly into a large frozen porous mass. This usually results in the product becoming very cold and hence giving up its vapor slowly. Another equally bad situation can also occur. Sometimes large, solid slabs of frozen product become too warm locally at the points of contact with the warm walls of the container, resulting in melting at these points where the temperature is locally high and the escape of vapor is restricted. This local melting sometimes occurs notwithstanding the fact that the rest of the frozen product is still too cold to give off vapor rapidly. Furthermore, the large mass or large chunks offer very small area in proportion to their volume. Another disadvantage in freezing in bulk comes when an attempt is made to transfer the dried mass into another container. This is especially difficult when the transfer must be effected with absolute sterility. The large mass can generally be broken into chunks, but the chunks are irregularly shaped and do not pour well. The chunks are also not of the most desirable appearance. Grinding these chunks after desiccation is awkward if sterility must be maintained.

(3) The older methods are not suitable for continuous production. Where it is desirable to continuously feed a liquid or semi-solid product through a single apparatus which takes it directly and continuously, to a suitable final dryness, the older methods are awkward. The invention permits this awkwardness to be overcome in a simple manner.

The desirable objects attained by the instant invention may be briefly set forth as follows:

The final volatile component is removed from the product while the latter is in the form of suitable, small, porous frozen particles of relatively uniform size and mass. The invention also includes a convenient, efficient, and rapid method for continuously and directly producing suitable frozen particles of liquid and semi-solid products, and of introducing these into the vacuum region where the final drying is made to take place. The method for producing and introducing frozen particles has other important advantages, including a means for almost instantaneously removing an initial fraction of the volatile component, and also a means for controlling and predetermining the fraction of volatile components lost before freezing sets in so as to produce a more suitable final product.

The following more detailed outline of the advantages of the instant process over older processes is of particular interest in reference to large scale production and commercial applicability of the process:

I. The drying time can be very greatly reduced. The conversion of liquid to dry solid can be done in one hour or less, whereas older methods require from ten to sixty hours for comparable quantities.

II. The product is superior.
   A. The product desired, whether granular, flaky, or in powder form, as well as the size and nature of the particles, can be prearranged and controlled. (Note: The old method generally requires the production of slabs or chunks which must later be broken up or ground if they are to be conveniently transferred into final storage bottles. The only alternative is to dry the product while the latter is already in the final bottle; this is very inefficient on a large scale although it may be practical on a small or moderate scale.)
      (1) The particles can be made so that they readily pour into final containers.
      (2) The granules offer great area. Each granule is very porous due to the extremely rapid freezing method used, which might be termed "explosive" freezing. This makes the particles extremely soluble.
      (3) The final product can be obtained in any degree of granulation without any grinding or mashing operations. A flaky, granular, or powder shape may be selected.
      (4) The appearance of the particle form is better.
   B. The volume occupied by the final product can be predetermined and controlled, so as to obtain a more useful and convenient product. (Older methods generally produce a too bulky final product.)
      (1) The final volume can be made smaller so that more product can be put in a given sized bottle.
   C. The process is direct and rapid, and can be made to operate at conditions less likely to damage delicate products.
      (1) The freezing is done almost instantaneously without requiring any pre-conditioning of the liquid.
         (a) Rapid freezing is known to be superior to slow freezing.
         (b) Preliminary de-gassing is not necessary.
      (2) The product can be made to go through the complete drying process in an enclosed sterile vacuum. It can easily be kept sterile, and the final product can be removed sterilely.
         (a) The contamination hazard is cut down.
         (b) The handling is at a minimum.
      (3) The very low temperature can be maintained throughout the drying process although the drying is done very rapidly.
   D. Very low and uniform water content in the final product can be obtained.
      (1) The rate of loss of water accelerates with the degree of dryness. This is in contrast with older processes where the final water comes off so slowly, that it is inconvenient and impractical to remove the last traces.
   E. There is less danger of melting the frozen product during its drying.

III. The process can easily be carried out continuously or semi-continuously.
   A. Liquids or semi-solids can be converted into batches of dried products.
   B. Liquid or semi-solid products can be continuously introduced into the drying apparatus while the dried product can be removed continuously or semi-continuously from the apparatus in its final container (or ready to put into final containers).

I have experimentally determined that a frozen product such as frozen plasma can be made to take up heat very rapidly, and made to lose its volatile component very rapidly, if the product is in the form of small frozen particles, of relatively uniform size, of porous and otherwise suitable nature, and if a number of these particles are stirred or tumbled under certain conditions over a warm surface. If the frozen particles are stirred over a warm surface or region while in ordinary atmospheric surroundings, they take up heat so readily that they melt. However, if these frozen particles are stirred over a warm surface while openly exposed to open vacuum space (a space where the vapor evolved is removed sufficiently rapidly by a rapid pumping system), then the particles can easily be kept below their melting point and still in a condition where they give off their vapor rapidly. Complete dryness can be easily and safely attained in less than one hour, in contrast with the ten to sixty hours common with older processes.

The expression a "warm surface" or "warm region" is a relative one and is explained as follows: When a well-insulated frozen particle containing a volatile component such as water is exposed in vacuum, the initial loss of vapor cools the particle until the temperature of the particle becomes so low that its vapor escapes from its surface just as fast as it is pumped completely away. The temperature of the frozen particle can then be said to be in "equilibrium" with the "pumping speed" of the pumping system, the pumping system including the immediate environment of the particle itself as well as exhaust pipes, flues, traps, and actual pumps. A well insulated particle exposed in a high vacuum in general becomes very cold. However, this invention concerns the treatment of an aggregation of a number of particles, a group or pile of them up to several inches deep, in such a manner as to cause them to volatilize rapidly. Obviously, each particle will momentarily take on a different equilibrium temperature depending upon its state of vacuum exposure and of thermal insulation from a source of heat. When, for example, an aggregate of particles stands quietly at the bottom of a highly evacuated (rapidly pumped) vessel, only those particles which are at the bottom of the pile, in fact only that portion of these latter particles which are in actual contact with the surface of the bottom of the vessel, take on the temperature of the vessel. The other particles are all better insulated and better exposed and become much colder than the vessel. Actual experience with frozen particles of blood plasma, prepared in a manner to be described later, has shown that a pile of porous, irregular-shaped particles is in actual, direct contact with the walls of the containing vessel at only a very few points. However, those particles at the bottom of the aggregate, and in the neighborhood of the walls and bottom of the vessel, do have indirect thermal contact with the walls. This is because these particles are in a region of relatively high vapor pressure (poorer vacuum) due to the blanketing effect of the upper layers of particles. The upper layers inhibit the easy escape of vapor to such an extent that the lower particles are bathed in more dense vapor. This dense vapor conducts heat energy readily and acts as an indirect conveyance of the heat of the vessel walls to the irregular porous surfaces of the lower particles. This indirect conveyance proves more effective than that due to conductivity through the few available points of contact.

The foregoing tends to interpret physically what is meant by a "warm surface" and a "warm region." A warm surface is one which has a temperature higher than the coldest particle in the aggregate. A warm region is a region where relatively good thermal contact (direct or indirect) can be provided between the particles and a source of heat—such as a warm surface or any other heat source, such as, for example, an induced high frequency field of energy. Since some of the better exposed and insulated particles can easily be made to take on very low temperatures, for example —50° C., a "suitable warm surface" can be any temperature between —50° C. and the highest that the product can safely tolerate (40° C. for blood plasma).

I have experimentally found that an aggregate of suitable frozen particles can be safely heaped several inches deep in the bottom of a rapidly exhausted vessel whose walls and bottom are kept at a temperature far above the melting point of the product, without danger of melting and coalescing the particles in such a way as to spoil the advantage of their frozen state. Frozen particles, in contrast with large slabs and irregular sized chunks of frozen material, are in no danger of melting, regardless of the temperature of the vessel, as long as the vessel is provided with a sufficiently rapid exhaust system. Large chunks frequently melt where a large face is in good direct contact with a too warm surface and there is no easy path of escape of the locally formed vapor.

I have further discovered that when an aggregate, or pile, of suitable frozen particles are so stirred, tumbled, or otherwise agitated, that the relative positions of the individual particles are exchanged (all this being done in a vessel maintained in a highly exhausted condition and whose walls, bottom, or other surface or region, are maintained relatively warm and at least momentarily accessible to contact or proximity with the several particles), the aggregate then rapidly and efficiently gives up its volatile component so that it can be pumped away in the form of vapors and trapped gases. If the particles are of uniform size and the stirring is uniform, the particles dry uniformly throughout the aggregate. Large dense particles dry very much more slowly than small; porous ones whose surface is irregular and extended by corrugations, projections, and indentations. The particles must never be so cut off from exposure to the vacuum space that their vapor cannot escape fast enough to keep them cooled below freezing until the last of their volatile components has gone off and only their skeletons remain. For example, there must be no cavity into which the particles can fall and be so confined that their vapors cannot escape readily.

The particles should be so agitated that they are momentarily (as individuals or in aggregate) in a region of good thermal access but not entirely cut off from the pumping system and then transferred to a region of good vacuum exposure where their warmth permits them to emit vapor rapidly. A simple practical example is that of a pile of particles tumbled in a cylindrical tumbling drum which is maintained in a highly exhausted condition by means of a conventional vapor pumping system.

I further have discovered that if a liquid or semi-solid substance is exposed to a highly evacuated space suddenly, but in small volumes, these small volumes freeze explosively and suddenly. Small volumes of liquid may be quickly pushed into vacuum exposure or else a continuous stream or sheet of liquid may be projected into vacuum space. The rate and manner is so controlled that the liquid freezes as fast as it enters the region of good exposure. Further, if isolated and separate liquid volumes are exposed individually, separate frozen particles are formed. Also, if streams or sheets of liquid are so exposed that their explosive freezing, the expansion and contraction due to their rapid cooling and freezing, causes the ice to fracture, then too the result is a number of frozen particles. No grinding mechanism is necessary, although a mechanism for interrupting the continuous flow of liquid, and for directing and ejecting out of the way the resulting frozen particles, may be desirable.

The device for producing and introducing frozen particles, which forms a part of this invention, will be referred to as the injector, or injection device.

One purpose of the injection device is to offer a convenient and effective means for introducing liquid substances into a vacuum system in a form and condition suitable for further drying and processing. It has been found that subsequent drying and processing can be best carried out when the injection device produces and introduces a number of small frozen granular or flaky particles of a uniform size, each particle having a very irregular and porous surface (that is, each particle has a large area in proportion to its volume). The examples of injection devices hereinafter to be described are so designed as to accomplish this in an efficient and rapid manner.

A second purpose of the injection device is to freeze the liquid much more rapidly than is possible with older methods. Rapid freezing is highly desirable in some products. The injection devices here described do this by exposing portions of the liquid suddenly to the open vacuum space, in such a way that evaporation takes place very rapidly and cooling and freezing are explosively sudden. When liquid is introduced into the vacuum in such a way that a large area in proportion to volume is exposed to the vacuum, the evaporation is very rapid, and hence the freezing is rapid. The injection devices described here cause the liquid to change to the frozen state in about one-tenth of a second, or less. No preliminary processing is necessary before the injection step. No preliminary "degassing" of the liquid is necessary, nor any preliminary lowering of the temperature of the liquid. The liquid can be introduced at any convenient temperature and almost instantly converted to the frozen state. Furthermore, whereas older processes sometimes require the liquid to first "super-cool" before freezing takes place, the sudden introduction of liquid directly into the vacuum space is highly unfavorable to super-cooling. No delay in the freezing process due to super-cooling need be experienced with the instant process.

A third purpose of the injection device is to utilize, in a beneficial manner, the initial evaporation which causes the initial cooling and freezing (and cooling below freezing) to remove a portion of the water from the product. There is no novelty involved in freezing liquid by evaporation of vapor from its surface, and likewise there is no novelty in considering the vapor lost in this way an advantageous outcome of the "auto-freezing" process. However, with the instant method of injection, a greater quantity of vapor can be lost simultaneously with the freezing process, and this quantity can be predetermined and controlled at will so as to be most beneficial to the subsequent processing and to the final product. The rate of flow of liquid, the temperature of the temperature control jacket, the thermal conductivity of the material of the injection device, and the length of time the liquid and solid are caused to remain in contact with the internal and external surfaces of the injector (contact with a source of heat) can be predetermined and controlled. These factors affect the relative amount of vapor lost during the injection step. A loss of vapor far in excess of that which can be attained by simple adiabatic auto-freezing has actually been attained by proper control of these factors.

The loss of vapor during injection has a further important advantage when products such as blood plasma are being processed. When such liquids are frozen and sublimated, the final bulk of the dried product is almost identical with that of the original frozen mass. The dried product can be conveniently pictured as the skeleton of the frozen mass, the volatile component having been removed without disturbing the original frozen shape. So if it is desired to have the final bulk small, it is better to have only a small liquid bulk at the moment of freezing. This small bulk is made possible easily with this injection freezing method by controlling the above-mentioned factors so that a great deal of vapor has already been lost before the product is frozen solid. Actual experiments have shown that the final bulk can be reduced to less than half of that possible with the older methods, without damaging or decreasing the porosity or solubility or usefulness of the product. This permits twice as much of the product to be put in a given storage and dispensing bottle. Experience has shown that the freezing speed is still fast and effective although the vapor loss during freezing is controlled by the above-mentioned factors—of course within certain limits.

The accompanying drawings are intended solely for purposes of illustration and it is not desired or intended to limit the invention in any way to the particular forms or devices illustrated, nor to any or all specific details thereof, excepting as may be defined in the appended claims.

Referring briefly to the drawings, wherein various examples of suitable apparatus for carrying out the invention and attaining the objects set forth above as well as other objects, are shown.

Figure 1 is a partly schematic longitudinal cross-sectional elevation of an apparatus for vacuum drying of properly exposed frozen particles which have been introduced into a drum and are tumbled by rotation of the drum.

Figure 2 is a view taken on the line 2—2 of Figure 1.

Figure 3 is a cross-sectional view taken on the line 3—3 of Figure 1.

Figure 4 is a partly schematic cross-sectional view of an apparatus including one form of an injector through which liquid may be introduced and converted in the receiving chamber into frozen particles.

Figure 5 is a cross-sectional view taken on the line 5—5 of Figure 4.

Figure 6 is a cross-sectional view taken on the line 6—6 of Figure 4.

Figure 7 is a view similar to Figure 4, illustrating another form of injector.

Figure 8 is a cross-sectional view taken on the line 8—8 of Figure 7.

Figure 9 is another view similar to Figure 4, illustrating still another form of injector.

Figure 10 is a cross-sectional view taken on the line 10—10 of Figure 9.

Figure 11 is a partly schematic and partly longitudinal cross-sectional view of the rotating injector cylinders or rollers of Figure 9, showing an electrical temperature control means for the rollers.

Figure 12 is a cross-sectional view of an apparatus for injecting the inflowing liquid into the receptacle in the form of frozen particles and simultaneously agitating or stirring the frozen particles for rapid drying, or for first operating the injector and then agitating the accumulated mass of frozen particles for drying.

Figures 13 is a cross-sectional view taken on the line 13—13 of Figure 12.

Figure 14 is a cross-sectional view taken on the line 14—14 of Figure 13.

Figure 15 is a partly schematic longitudinal cross-sectional view of an apparatus for carrying out the complete and continuous process from the introduction of the liquid to the bottling of the dried particles.

Figure 16 is a fragmentary view, similar to Figure 4, but showing an injector adapted for introduction of a semi-solid such as meat to be frozen into particles.

Figure 17 is a bottom plan view of the injector per se of Figure 15.

Figure 18 is a cross-sectional view taken on the line 18—18 of Figure 19, showing a continuous flow injector directed to a moving surface undergoing repeated distortion to free or snap off frozen particles adhering thereto.

Figure 19 is a cross-sectional elevational view, taken on the line 19—19 of Figure 18.

Referring in detail to the drawings, and first to Figures 1, 2, and 3, the numeral 20 indicates the supports of a frame on which is supported a trough 21 formed by the four walls 20*a*. Upright extensions 22 of the opposed end walls 20*a* have aligned openings therethrough to receive and provide bearings for the hubs 24 and 25 of a hollow airtight drum 23. The hubs 24 and 25 are partially conical, as shown, and have axial openings 24*a* and 25*a*, respectively, therethrough, and are provided with suitable packings 26. A cone-shaped screen 23*a* may be applied over the opening 24*a*, as shown. A pulley 27 on the hub 24 is linked to a drive pulley 28 by a belt 29, and thus the drum 23 is rotated through a reduction gear box 30 by a motor 31. A supply of warm water, entering through the pipe 32, is passed or sprayed through the multipore nozzle 33 about both sides of the drum during rotation of the latter.

A conventional mechanical air exhaust pump is shown at 34, driven by a motor or engine 35, leading by a pipe 36 to a conventional vapor trap 37. A bacteria-proof filter 39 may be provided in the pipe 36. A pipe 40 extends into the drum through the hub opening 24*a* and is joined to the vapor trap pipe 38. Through the other hub opening 25*a*, an injector 41, shown schematically, projects into the drum, to introduce into the drum in the manner hereinafter to be described, the frozen particles 42 of the liquid or semi-solid which it is desired to dry.

This device is a satisfactory example of rapid drying of the frozen particles 42. The vapor is continuously and rapidly removed through the pipe 40 and frozen in the trap 37, while warm water flows over the surfaces of the drum. Owing to the rotation of the drum, the granular or flaky particles 42 of frozen material are caused to be agitated in that they tumble over the inner surface of the drum and over one another. The term "agitate" wherever herein used, is intended to imply not only the tumbling just mentioned, but any other form of physical disturbance of the particles whereby their positions are changed with respect to themselves or to the other particles of the same mass. This illustrates the superior thermal and vacuum situation which results from stirring or tumbling particles in an open vacuum space 43. Region 44 is in good direct and indirect thermal contact with the warm walls. However, because of the open space between the particles, the vapor even here can escape rapidly enough to prevent melting, as exemplified by the broken line path 45. Region 46 is the region where the particles reach maximum vacuum exposure and lose vapor most rapidly. The essential feature illustrated in the above device is the satisfactory method of exchanging the positions of the particles 42 from the region 44 to the region 46.

It is to be noted that wherever "water" or a "water jacket" is mentioned herein, as a means for varying the temperature of any part, it is to be understood that any fluid other than water may be used.

Figures 4, 5, and 6 show an example of an injector, and the numeral 47 indicates an airtight vessel with a connection 48 for a rapid exhaust system. The injector 49 comprises a cylindrical housing 50 projecting into the interior 51 of the vessel 47. An axial opening 52 extends through the housing 50 and has at its open end a reduced nozzle 53. A channel 54 provides a passage between the outside of the housing 50 and the axial channel 52, and at the outside opening of the channel 54 an inlet pipe 55 is connected, through a valve 56, to the storage supply of liquid 57 in a sealed container 58. The pressure of the inflowing liquid is controlled by the valves 56 and 59, the latter being connected in a pipe 60 leading from a high air pressure supply, now shown. A pressure gauge 61 is mounted in the pipe 55.

A needle valve 62 is threadably engaged in the bore 52 and serves, in an obvious manner, to regulate the rate of continuous flow of the liquid out of the nozzle or orifice 53. A water jacket 63 is provided within the housing 50, having an inlet pipe 64 and an outlet pipe 65 communicating therewith through channels 64*a* and 65*a*, respectively. The orifice 53 and the face 66 of the injector are maintained at a desirable temperature, as is obvious, by the water jacket in which a suitable fluid is circulated. As is also obvious, the water jacket may be used to cool the inflowing liquid in the injector, instead of warming it, if desired.

Rotatably mounted adjacent and axially parallel with the injector, is a shaft 67 extending through the wall of the vessel and provided with a pinion 68 meshed by a drive pinion 69 driven by a motor 70. In the wiring diagram for the motor, a rheostat 71 is shown, whereby the speed of rotation of the shaft 67 may be regulated. A fan-like member 72 having one or more blades 73, is mounted on the end of the shaft 67, with the inner (right-hand) edges of the blades lying in the same vertical plane close against the face of the injector.

The cleaning off blades 73 are timed to such a rate of rotation, to permit a small amount of liquid to enter the vacuum space 51, spread around the orifice, and a freeze into a small puff or particle 74, before wiping the particle away from the face 66. The blades repeatedly remove these puffs as fast as they form, and the particles which thus fall are collected at the bottom of the vessel at 75, whence they may be removed by opening the trap door 76.

The form of injector 77 shown in Figures 7 and 8 is provided with a multiplicity of orifices similar to the orifice 53 of Figures 4 and 5. Herein the liquid is ejected out of a hole, then the liquid flow is cut off and an interval of time elapses before the cleaning off blade reaches the frozen puff, which by then is frozen brittle and is easily removed without smearing.

For purposes of simplification, the same reference numerals are used on the vessel 47 of Figure 7 as above, to indicate parts which are identical, and the same is true of the water jacket in the injector 77. The cylindrical housing 78 of the injector 77 has an internally beveled, or conical peripheral flange 79 projecting therefrom, and this flange is provided with a plurality of peripherally spaced holes 80. Through an axial bore 81 in the housing 78, a shaft 82 extends rotatably, and a by-pass 83 extends from outside the housing to a diametrically enlarged portion 84 of the bore 81. On its end the shaft 82 has a complementary frusto-conical plug 85 registering rotatably in the flange 79 but having its inner face 86 spaced from the face of the housing 78 at the base of the flange 79, to provide a peripheral disc-shaped space 87 communicating with the bore 84. A single right-angled by-pass 88 extends through the plug 85 between the conical surface of the plug and the space 87, the opening of this by-pass in the conical surface of the plug being widened as shown at 89 and lying in the same transverse vertical plane as that of the peripheral flange holes 80. It is apparent that, as the plug 85 rotates on the shaft 82 within the flange 79, the opening 89 will align successively with each of the holes 80. A chain of gears 90, driven by a motor 91, rotates the shaft 82. A speed control, not shown, similar to that shown in Figure 4, may be supplied for the motor 91 and for all other electric motors illustrated in the drawings. A wiper blade 92 is secured to the plug 85 and removes the frozen particles 74 which have formed about the openings 80. An advantage of this type of injector lies in that a great extension in speed is obtained because of the number of the holes 80, which may be increased to any desired number.

The injector shown in Figures 9, 10, and 11 is a form in which the liquid is introduced for exposure in the vacuum in a plurality of continuous streams, although but one such stream may be provided, if desired, instead of a plurality. Herein the injector housing 92a has a pair of vertically spaced projections 93 extending into the chamber 51, each having an axial bore 94 therethrough, and each bore 94 has a shaft 95 rotatable therein. On the ends of the shafts 95 are rigidly mounted rollers 96, spaced a greater or lesser distance apart. Between the rollers and behind a vertical plane through their axes, lies a horizontal pipe 97 having a plurality of holes 98 therethrough, facing toward the said plane. Wiper blade shafts 99 are pivotally mounted in suitable supports 100 and have blades 101 normally urged substantially tangentially against the rollers by springs 102. The liquid supply, not shown, enters through the pipe 103. A motor 104, through gears 105, rotates the rollers 96 in mutually opposite directions (in the directions of the arrows).

In this type of injector the streams of liquid into the chamber 51 are exposed between the rollers 96 which are almost in mutual contact. The liquid adheres to the rollers, freezing as they carry it away. Actually, the freezing causes the liquid stream to break up into a number of isolated puffs. Some flakes adhere slightly and are knocked off when they reach the blades 180 degrees beyond, and the blades free all puffs or particles which have not jumped off previously. No interrupting or pulsating means for the liquid flow is here necessary but may be provided if even more uniform size is desired in the frozen particles. The inflow of liquid as shown, is controlled by the valve 106.

It is to be noted that in all of the apparatus shown in the drawings, suitable air-tight stuffing boxes or other packing means is to be provided around all shafts or rotatable parts which extend from outside the vacuum vessel or receptacle to the inside vacuum space. Since the present invention is not concerned with any particular or new kind of packing or sealing means, all such means have either been illustrated in a conventional manner or have been entirely omitted.

In Figure 11 is illustrated a modification of Figure 9, showing a means for controlling the temperature of the rollers 96. Since the rollers may become very cold but are most effective at temperatures just below the freezing point of the liquid or semi-solid substance, some suitable means for control of their temperature may be desirable. Herein the rollers 96a are hollow, as are also their shafts 95a. In each roller a resistance or heat coil 107, shown schematically, is mounted, and a two-conductor lead 108 leads therefrom through the hollow shaft 95a. By extending these shafts beyond their gears 105 and supplying them in a conventional manner with current-carrying slip rings 109 and connecting the leads 110 of the conductor 108 thereto, a suitable electric current supply may be fed to the resistances 107. The wiring diagram of Figure 11 shows a rheostat 111 in series with the rings 110 and coils 107 and an electric source. The temperature of the rollers, their speed, the speed of the liquid flowing in, can all be controlled, and these factors determine the shape and size of the particles produced and their water content.

In Figures 12, 13, and 14 is illustrated an apparatus suitable for carrying out the complete process of freezing and drying, either as a continuous operation, or first freezing and accumulating a mass of frozen particles and then drying them. Herein a vessel 112, circular in cross-section, enclosing a vacuum space 113, has a suitable exhaust pump connection 113 in the neck 114 of the vessel. A shaft 115 extends rotatably through the vessel and is adapted to be rotated by any suitable means, not shown. A sleeve 117 is rigid on the shaft 115 and a pair of co-planar paddles or blades 117, T-shaped in outline, extend from the sleeve with their outer edges adapted to move close to the inner cylindrical surface 118 of the vessel. Spaces 119 are provided between the blades. A water jacket 130 partially encloses the vessel 118 to supply heat thereto, and a plug 131 permits of removal of the dried or partially dried particles.

Frozen particles 74 are introduced into the vessel through the injector 120, which may be of any desired type or form but which in Figures 12 and 13 is illustrated as embodying another type of wiper. The injector 121 otherwise may be considered identical to that shown in Figures 4, 5, and 6, and such details thereof as are shown in Figures 12 and 13 are similarly numbered. The wiper comprises a blade 122 secured to a stem 123 extending pivotally through the cap 124 and having a coiled spring 125 surrounding the stem and anchored at one end to the blade and at the other to the cap sleeve 126. A motor 127 drives a cam 128 against the surface of which an arm 129, rigid with the stem 123, is normally urged by the spring 125. It is obvious that rotation of the cam by the motor imparts an oscillating movement to the wiper blade 122 past the injector orifice 53.

The liquid source is introduced into the injector through the connection 55 and upon emerging at the orifice 53 in the vacuum space 113 it freezes as described before, and the oscillating wiper repeatedly wipes off the adhering frozen particles from the face of the injector. The stirring operation of the frozen particles 74 may be carried on simultaneously with the injection operation, if desired, by simply rotating the shaft 115 simultaneously. The accumulated particles are thus stirred in such a manner as not to interfere with the easy and rapid escape of vapors and gases given off by the particles. The latter feature applies also to the other forms and means for stirring, tumbling, or moving the frozen particles during the drying operation, which are set forth in the drawings. The blades 116 obviously move, stir, and tumble the particles 74 so that those particles which are at one time insulated from the warm surface (the lower half of 118) are repeatedly brought into thermal contact with, or in the neighborhood of, the said surface, or region, which is capable of transferring to said particles quantities of heat from the warm water in the jacket 130.

The movement of the particles in all of the forms illustrated is done in every case so that the relative positions of the particles is repeatedly or continuously changed so as to expose them part of the time to open vacuum (where they rapidly lose vapor) and part of the time so that they come into good thermal contact with the source of heat, where they pick up heat.

In Figure 15 is presented an apparatus for carrying out a fully continuous drying process of a liquid on a very large scale. This apparatus is capable of converting the liquid product into an extremely dry or partially dry final product in a continuous fashion, then transferring this processed material into final containers as fast as it is produced, and in such a manner that the transfer is carried out within a closed sterile and evacuated space. The final containers can be sealed under sterile conditions, and while either evacuated or filled with any desirable gas, such as nitrogen, for example.

The method of introducing into final containers and sealing under vacuum, in a continuous fashion, is desirable in some cases where the product would spoil if other than vacuum stored and would be in danger of contamination if transferred in open air (blood plasma, for example). The continuous nature of the transfer of the dried particles is made possible by the pouring qualities of the small particles produced by the instant process.

A long cylinder 132 is provided with a manifold 133 having communication therewith through the openings 134, and at the end 135 of the manifold a conventional large capacity very rapid vapor exhaust system, not shown, is attached. Screens 196 may be mounted in the passages 134 and 142 to prevent escape of any very fine flaky particles which may be formed. A gate valve 135 is adapted to close the manifold at that end when desired, and a pressure gauge 136 is mounted adjacent thereto. A water jacket 137 surrounds the cylinder 132 and is provided with an inlet 138 and an outlet 139. At the other end of the cylinder, a hood 140 is mounted on and encloses access both to the cylinder and to the manifold, the path from the hood to the former being shown at 141 and to the latter at 142. The injector 144 projects into the hood through the cap 143 thereof. The source of liquid supply and its connection with the injector, and the water jacket of the injector as well as its inlet and outlet, are all similar to, and have therefore been given the same reference numerals as, those shown in Figure 4. The injector shown in Figure 15, however, is of yet a different type, having the two orifices 145 which are adapted to open only when the single eccentric opening 146 through the disc 147 is aligned therewith, to permit escape of the supply liquid into the hood, and the disk 147 is rotated on a shaft 148 by the motor 149 through reducing gears. The wiper blade 195 is integral with the extension 148a of the shaft 148.

Frozen particles which leave the injector fall down the path 141 into the cylinder 132. A shaft 150 extends through the cylinder 132 and is driven by the motor 151 through reducing gears 152. This shaft has rigid thereon a plurality of spaced blades or paddles 153. These paddles are alternately positioned at 180 degrees from each other, and they are provided with screw-twisted blades 154 (somewhat after the fashion of an airplane propeller), the direction of twist of the blades being such as to urge the particles 74 toward the exit 155 during rotation of the shaft 150. Thus, the latter rotation causes the paddles 153 to advance the particles (which have fallen down the path 141 to the bottom of the cylinder at the front end) step-by-step along the cylinder to the opposite or exit end. In addition, the paddles obviously spread some of the particles up the sides of the cylinder walls and in general stir all of the particles in the same manner as does the paddle 117 of Figures 12 and 13.

The cylinder 132 may be sloped downward toward the right to a greater or lesser degree to the horizontal, and the paddles and cylinder provide such configurations as to cause the particles to be stirred and tumbled up the walls of the cylinder and at the same time to move the particles, as just mentioned, in a slow progress toward the exit vent 155. The frozen particles progress along the cylinder at such a rate that they are sufficiently dry when they reach the vent 155. A cut-off disc 156, secured to and moved by a stem 157, permits the exit vent to be opened to permit dried particles to be ejected by gravity and the action of the stirring paddles, into a hopper 158. To permit airtight movement of the stem 157, a bellows 160 surrounds the same outside the device, in a conventional manner. The head 159 of the hopper 158 is rotatably connected to the exit vent 155 so that the hopper may be tilted upward to a position at an angle in excess of 90 degrees to its normal substantially vertical position, as and for the purpose presently to be described. Means, not shown, may be provided to keep the disc 156 open. A pressure gauge 161 is mounted, as shown, at the exit end of the cylinder, and thereadjacent is a pipe 162, with a valve 163, giving access to the cylinder. The pipe 162 branches into a steam inlet pipe 164 and a steam exhaust or vacuum pipe 165, both valved, by means of which the entire interior of the device may be sterilized with live steam under pressure and then exhausted, prior to use. The valve 166 permits of shutting the hopper outlet. A vapor gauge 167 on the hopper permits of checking the degree of dryness of the particles in the hopper.

A bottle filling chamber is shown at 168, into which the hopper outlet has communication through the opening 169; the valve 166 is closed except when the chamber 168 is also highly evacuated and a bottle 170 is in place within the chamber, beneath the hopper outlet. Branches 171 and 172 of the pipe 173 leading from the chamber 168, lead to an exhaust pump and to a sterile gas supply, respectively. Valves 166, 171 and 172 permit the chamber 168 to be used as an air lock for introducing empty bottles and removing full ones. The gauge 174 indicates the degree of vacuum in the chamber 168, and the pivoted door 175, provided with airtight sealing means, not shown, permits new bottles to be introduced. The plunger 176 and its bellows 177, similar to the bellows 160, permit filled bottles 170 to be pushed into position 170a where a suitable seal or stopper 178 can be placed in its neck by the bellows and plunger device 179. Once sealed, the bottle is removed from the chamber 168 after the valve 172 is opened and atmospheric pressure is established in the chamber. Thus the bottles may be sealed while exhausted or filled with any desired gas.

The apparatus of Figure 15 is illustrated simply as an example of a fully continuous processing and sealing into final containers under rapid and desirable conditions of sterility. Such an apparatus is capable of a relatively high processing rate. Large quantities of human blood plasma, for example, could be processed in a short time. A similar device six feet long has been calculated to dry several hundreds of litres of plasma daily. It is expected to completely process and package the plasma in one hour. This capacity is several thousands of times that attained by conventional equipment of the same size.

It may be desirable to make the entire device tiltable in a vertical plane. Therefore any suitable means may be provided, such as the following. An ear 180 is provided on top of the manifold 133 and is pivotally suspended from a support 181. In order to give stability to the device in any tilted position, a pair of spaced jacks 182 are mounted under the device.

A possibility is that a quantity of particles which have entered the hopper 158 may be found to be insufficiently dry. Then, with the hopper outlet closed, the hopper may be swung upward about its rotatable union at the vent 155, and the apparatus may be tilted in a counter-clockwise direction, whence the particles in the hopper may be sent back into the cylinder for further drying.

Figure 16 is presented for the sole purpose of providing an example of an injector of introducing a semi-solid substance into the evacuated vessel 47. The injector 183 comprises a housing having a knife-edged worm 184, substantially similar to that of a common meat chopper or grinder, rotatable therein. A multi-orificed disc 185 closes the housing within the vacuum space 51, and a wiper 186, similar in principle to those already described, is secured to the spindle of the worm. Meat or any other semi-solid substance fed into the hopper, not shown, of the injector 183 (and this may obviously be done under sealed and sterile conditions, is desired), is forced through the orifices of the injector, and upon emerging it will freeze explosively in the same manner as described in reference to liquids. The wiper will then, as before, wipe off the adhering particles of frozen material.

Another example of device for attaining the desired form and small size of frozen particles from the continuous stream injection of a liquid, is shown in Figures 18 and 19. A simple needle-valved injector is shown at 187, through the orifice 53 of which the inflowing liquid will pass. Mounted in front of this orifice is an endless belt 188 of suitable material, trained about spaced rollers 189. The rollers may be provided with sprocket teeth to register in corresponding spocket slots in the edges of the belt to prevent slipping of the belt. A shaft 190, offset rearward of the plane through the axes of the rollers, extends down between the two sides of the belt 188 and has rigid thereon in mutually spaced relationship, a pair of dumbbell-like prongs 191 and 192, offset 90 degrees from each other in a horizontal direction. The shaft 190 is rotated simultaneously with the rollers 189, but at a higher speed, by the chain 193. For a portion of each rotation of the shaft 190, first the upper member 191 and then the lower member 192 will spread the corresponding portion of the adjacent or rearward side of the belt (at the top and bottom, respectively), thereby distorting and twisting the rearward surface of the belt. The partially frozen liquid impinging on the forward belt surface from the injector will further freeze and cling thereto, and while being carried around to the other side will have time to freeze thoroughly. Some of the material, which will cling to the belt in the form of flakes, puffs, or small sheets, will, because of its brittle nature, be snapped off in small particles as the belt rounds the roller. But whatever material remains on the belt will be snapped off by the impinging and distorting action of the members 191 and 192 against the rear side of the belt, whence they will fall to the bottom of the vessel. Herein some means, not shown, may also be provided for warming the belt or sheet 188. Such means could be electric heating resistances such as shown in Figure 11. Drive means for the rollers is shown in the form of a chain 194, merely as an example of such means.

In all of the injectors above described and illustrated in the drawings, the substance fed therethrough in either a thin stream or in successive drops freezes so suddenly upon entering the vacuum space that it might be termed "explosive" freezing. Some small bits of the explosively frozen drop or spray fly off in radial directions from the orifice. In those injectors provided with wipers, the drop is given an interval of time, before being wiped off, in which to lose a large fraction of its initial moisture content while completely freezing (up to fifty percent of its moisture content) by the application of heat to the injector, as set forth. In those injectors in which the spray strikes a moving or distortable surface, this moisture loss during complete freezing occurs on that surface.

The type or size of the frozen particles is largely determined by the type of the stream (whether continuous or interrupted), the size of the orifice, the speed of the inflow, the pressure and temperature of the inflowing stream, as well as the interval between freezing and wiping off.

Other forms and types of injectors and means for removing clinging particles therefrom to permit them to fall, as well as modifications of the forms shown and described, may obviously be provided, and the same applies to the means for drying the frozen particles. Such changes as well as refinements which may bring the process to a higher degree of perfection or efficiency, may all be made without departing from the spirit and scope of the invention.

I claim:

1. The method of freezing a substance including at least one liquid and at least one solid which comprises introducing said substance to be frozen in the form of small drops into a chamber, said chamber being under a vacuum so extremely high as to provide an extremely low vapor pressure of water and to effect instantaneous freezing of the substance and the removal of the water vapor therefrom by vaporization, and agitating the frozen drops of said substance within said chamber while simultaneously applying heat thereto in order to remove practically all the moisture in said drops and while keeping them cooled below freezing.

2. The method set forth in claim 1 wherein the operation of agitating said frozen drops is continued while supplying heat to effect a substantially complete dehydration of the substance.

3. The method of freeze-drying an organic-containing substance other than substantially wholly volatile matter including masses containing at least one liquid and at least one solid to at least partially dehydrate said substances which comprises suddenly introducing said substance to be solidified into a chamber while maintaining a vacuum in said chamber so extremely high as to provide an extremely low vapor pressure of water and to effect sub-dividing and freezing of the substance into solidified porous particles containing frozen liquid and continuing the aforesaid step of maintaining said vacuum in said chamber to keep said particles in a frozen condition and to effect the removal of controlled amounts of vapor of the frozen liquid from said substance by vaporization whereby said substance is converted into dehydrated solid particles containing only minor amounts of said liquid, finally removing the solid particles from the vacuum chamber while maintaining the vacuum in said chamber.

4. In the freeze-dry process of dehydrating an organic-containing substance other than substantially wholly volatile matter including masses containing at least one liquid and at least one solid, the improvement which comprises introducing said substance in the form of small drops into a chamber under a vacuum so extremely high as to provide an extremely low vapor pressure and to solidify said substance into solid, porous particles containing frozen liquid, then effecting heat exchange, while continuing said vacuum, between the solidified frozen particles and a body at a temperature always higher than the freezing point of the particles while controlling the amount of heat exchange to less than enough to melt said frozen particles, withdrawing said particles from heat exchange with said body without melting said frozen particles, and continuing the aforesaid steps until the desired amount of volatile matter is removed and the substance is dried to the desired extent.

5. A method of freeze-drying an organic-containing substance other than substantially wholly volatile matter including masses containing at least one liquid and at least one solid to dehydrate said substances which comprises subjecting isolated portions of said substance to be solidified to a vacuum so extremely high as to provide an extremely low vapor pressure of water and to effect solidifying and freezing of the aforesaid isolated portions of said substance into solidified particles containing frozen liquid, and continuing to subject said solidified frozen portions of said substance to the aforesaid vacuum to effect the removal of controlled amounts of vapor of the frozen liquid from said portions of said substance whereby said solidified particles of said substance are dehydrated to produce solid dehydrated particles of said substance containing only a minor amount of said liquid, finally removing the solid particles from the vacuum chamber while maintaining the vacuum in said chamber.

6. A method of freeze-drying a substance, which substance is of a liquid to semi-solid nature and contains at least both one volatile and non-volatile constituent at the temperature and pressure of freezing which comprises suddenly subjecting a flowing stream of a substance to be solidified in a chamber to a vacuum so extremely high as to provide an extremely low vapor pressure and low freezing temperature and to effect freezing and solidification of the substance into a solid frozen film, sub-dividing said solid frozen film to form subdivided solid frozen particles and dehydrating said frozen particles by maintaining said vacuum while supplying external heat to said frozen particles to effect vacuum sublimation and the removal of controlled amounts of vapor of the liquid from said substance whereby said sub-divided solid particles are dehydrated to produce solid dehydrated particles of said substance containing only a minor amount of said liquid.

7. In the method of rapid freeze-drying a substance containing at least one liquid and at least one solid in a vacuum chamber, the improvement which comprises introducing said substance into said chamber while under a vacuum so extremely high as to effect exploding of such substance and to effect instantaneous freezing of said exploded substance in the form of frozen particles, bringing said frozen particles into contact with a warm surface at a temperature always maintained higher than the freezing point of said frozen particles without substantially melting said frozen particles while agitating said frozen particles on said warm surface, continuing the dehydration of said frozen particles by vacuum sublimation in said chamber and heating and agitating the same until the liquid content of said frozen particles has been reduced to the desired extent and withdrawing said frozen particles having a desired reduced liquid content from said chamber.

8. In the method of rapid freeze-drying a substance containing at least one liquid and at least one solid in a vacuum chamber, the improvement which comprises introducing said substance into said chamber while under a vacuum so extremely high as to effect exploding of such substance and to effect instantaneous freezing of said exploded substance in the form of frozen particles, bringing said frozen particles into contact with a warm surface at a temperature always maintained higher than the freezing point of said frozen particles without substantially melting said frozen particles while agitating said frozen particles on said warm surface, continuing the dehydration of said frozen particles by vacuum vaporization in said chamber and heating and agitating the same until the liquid content of said frozen particles has been reduced to the desired extent, withdrawing said frozen particles having a desired reduced liquid content from said chamber, and immediately packing said withdrawn particles with the desired reduced liquid content in a sealed container.

9. The method of freeze-drying an organic-containing substance of a liquid to semi-solid consistency including substances containing at least one liquid and one solid which comprises subjecting a stream of said substance to a vacuum so extremely high as to provide an extremely low vapor pressure of water to freeze the liquid in said substance, heating said flowing stream immediately prior to the solidification, and after said freezing continuing the maintenance of said vacuum while heating the porous frozen particles to effect removal of vapor therefrom and to produce solid dehydrated particles of said substance containing only a minor amount of liquid.

10. A method of freeze-drying an organic-containing substance of liquid to semi-solid nature and which contains at least both one volatile and non-volatile constituent at the temperature and pressure of freezing, which comprises suddenly introducing a flowing stream of said aforesaid substance in a chamber kept under a vacuum so extremely high as to provide an extremely low vapor pressure and to effect freezing and solidification of the substance into frozen solid particles, sub-dividing said solid, frozen substance into particles, and dehydrating said frozen particles without substantial melting by maintaining said vacuum while supplying external heat to said sub-divided frozen solid particles to produce solid dehydrated particles of said substance containing only a minor amount of liquid.

11. In the method of freeze-drying a substance, the steps which comprise suddenly injecting an organic-containing substance of a liquid to semi-solid nature which contains at least both one volatile and non-volatile constituent at the temperature and pressure of freezing into a chamber under vacuum so extremely high as to provide an extremely low vapor pressure of water to effect instantaneous freezing of the substance into frozen solidified particles by vaporization of water therein, carrying the frozen substance away by a moving surface from the locus of first exposure where the substance is injected into said vacuum thus preventing an obstructing accumulation, and continuing the maintenance of said vacuum in said chamber to keep said particles in a frozen condition and to effect the removal of controlled amounts of vapor of the frozen liquid from said substance by vaporization whereby said substance is converted into dehydrated solid particles with the removal of substantially all of said liquid from said substance, and finally removing the solid particles from the vacuum chamber while maintaining the vacuum in said chamber.

12. In the method of rapidly freeze-drying a substance, the improvement which comprises introducing an organic-containing substance of liquid to semi-solid nature containing at least both one volatile and non-volatile constituent at the temperature and pressure of freezing into a chamber under a vacuum so extremely high as to explosively freeze said substance into porous solid particles, preventing obstructing accumulation from occurring by carrying the frozen substance away from the locus of first exposure where the substance is injected into said vacuum by a moving surface, maintaining said vacuum in said chamber to keep said particles in a frozen condition and to effect the removal of controlled amounts of vapor and the frozen liquid from said substance by vaporization whereby said substance is converted into dehydrated solid particles containing only minor amounts of said liquid, and finally removing the solid particles from the vacuum chamber while maintaining the vacuum in said chamber.

13. In the method of rapidly freeze-drying a substance, the improvement which comprises introducing an organic-containing substance containing at least both one volatile and non-volatile constituent into a chamber under a vacuum so extremely high as to explosively freeze said substance into porous solid particles of the group consisting of granules, flakes and powders, preventing obstructing accumulation from occurring by carrying the frozen substance away from the locus of first exposure where the substance is injected into said vacuum by a moving surface, effecting heat exchange, while continuing said vacuum, between the solid particles and a body at a temperature always higher than the freezing points of the particles while controlling the amount of heat exchange to less than enough to melt said frozen particles whereby said substance is converted into dehydrated solid particles containing only minor amounts of said liquid, and finally removing the solid particles from the vacuum chamber while maintaining the vacuum in said chamber.

14. In the method of rapid freeze-drying, the improvement which comprises explosively freezing an organic-containing substance composed of at least both one volatile and non-volatile constituent by introducing the same under pressure through an inlet orifice having a selected size and shape into a chamber under a vacuum so extremely high as to effect exploding of said substance into porous particles of the group consisting of granules, flakes and powders and to effect instantaneous freezing of the same, controlling the size and physical nature of said frozen particles by varying the pressure of introduction, the size and shape of the inlet orifice and the vacuum within the chamber whereby subsequent grinding and disintegration is unnecessary by exposing isolated and separate liquid volumes individually, preventing obstructing accumulation from occurring by carrying the frozen substance away by a moving surface from the locus of first exposure where the substance is introduced into said vacuum chamber, and agitating the frozen particles of said substance within said vacuum chamber while simultaneously applying heat thereto in order to remove controlled amounts of vapor of the frozen liquid from said substance by vaporization while keeping the particles cooled below freezing whereby said substance is converted into dehydrated solid particles containing only minor amounts of said liquid, and finally removing the solid particles from the vacuum chamber while maintaining the vacuum in said chamber.

15. In the method of rapidly freeze-drying a substance, the improvement which comprises introducing a substance of liquid to semi-solid nature which contains at least both one volatile and non-volatile constituent at the temperature and pressure of freezing into a chamber under a vacuum so extremely high as to explosively freeze said substance into porous solidified particles, mechanically removing the frozen substance from the locus of injection within the vacuum chamber to prevent obstruction by accumulating frozen substance, continuing to subject said solidified frozen portions of said substance to the aforesaid vacuum to effect the removal of controlled amounts of vapor of the frozen liquid from said portions of said substance whereby said solidified particles of said substance are dehydrated to produce solid dehydrated particles of said substance containing only a minor amount of said liquid and continuing the aforesaid steps to keep said particles in a frozen condition to effect the removal of controlled amounts of vapor of the frozen liquid from said substance by vaporization whereby said substance is converted into dehydrated solid particles containing only minor amounts of said liquid, and finally removing the solid particles from the vacuum chamber while maintaining the vacuum in said chamber.

16. In the method of rapidly freeze-drying a substance, the improvement which comprises introducing a substance of liquid to semi-solid nature which contains both one volatile and non-volatile constituent at the temperature and pressure of freezing into a chamber under a vacuum so extremely high as to explosively freeze said substance into frozen porous solid particles, mechanically preventing the frozen substance from obstructing the introduction of the substance by carrying the frozen substance away from the locus of first exposure to vacuum on a moving surface within the chamber, bringing said frozen particles into contact with a warm surface at a temperature maintained higher than the freezing point of said frozen particles without substantially melting said frozen particles while agitating said frozen particles on said warm surface, and continuing the dehydration of said frozen particles by vacuum vaporization in said chamber and by heating and agitating the same until the liquid content of said frozen particles has been reduced to the desired extent whereby dehydrated solid particles of said substance containing only a minor amount of said liquid are produced, and continuing the aforesaid steps to keep said particles in a frozen condition to effect the removal of controlled amounts of vapor of the frozen liquid from said substance by vaporization whereby said substance is converted into dehydrated solid particles containing only minor amounts of said liquid, and finally removing the solid particles from the vacuum chamber while maintaining the vacuum in said chamber.

17. In the method of freeze-drying a substance, the steps which comprise introducing a substance of a liquid to semi-solid nature containing at least both one volatile and non-volatile constituent at the temperature and pressure of freezing into a chamber where a vacuum sufficiently high to cause the instantaneous freezing of the substance is maintained, exposing the frozen substance to agitation while exposed to heat without permitting the substance to melt appreciably and the substance is dehydrated and without interrupting said vacuum until substantially only solid dehydrated components remain, and finally removing said solid, substantially completely dehydrated components from the chamber without interrupting the vacuum.

18. The method of freeze-drying an organic containing substance other than substantially wholly volatile matter including masses containing at least one liquid and one solid, which substance is of a liquid to semi-solid nature to at least partially dehydrate said substance which comprises suddenly introducing said substance to be frozen into a chamber in the form of small drops while maintaining a vacuum in said chamber so extremely high as to provide an extremely low vapor pressure of water and to solidify said substance into solid porous particles containing frozen liquid and continuing the aforesaid steps of maintaining said vacuum in said chamber to keep said particles in a frozen condition and to effect the further removal of substantial amounts of vapor of the frozen liquid by vaporization from said substance whereby solid dehydrated particles of the substance are produced with removal of substantially all of said liquid from said substance, finally removing the solid particles from the vacuum chamber while maintaining the vacuum in said chamber.

19. The method of freeze-drying an organic substance which substance is of a liquid to semi-solid nature and contains at least both one volatile and non-volatile constituent at the temperature and pressure of freezing which comprises introducing said substance into a chamber under a vacuum so extremely high as to provide an extremely low vapor pressure of water while carrying the frozen substance away from the locus of injection and first exposure to vacuum on a moving surface so that obstruction is avoided, keeping said substance in wetting contact with a traveling heated surface while exposed to the vacuum until a significant amount of water is removed, then causing said substance thus introduced into said chamber to freeze to a subdivided state by removal of additional amount of vapor by said vacuum, and scraping the frozen material from said heated surface and continuing the aforesaid steps to keep said particles in a frozen condition to effect the removal of controlled amounts of vapor of the frozen liquid from said substance by vaporization whereby said substance is converted into dehydrated solid particles containing only minor amounts of said liquid, and finally removing the solid particles from the vacuum chamber while maintaining the vacuum in said chamber.

20. In the process of freeze-drying an organic-containing substance which substance is of a liquid to semi-solid nature and contains at least both one volatile and non-volatile constituent at the temperature and pressure of freezing to produce solid, porous particles while maintaining a vacuum so extremely high as to provide an extremely low vapor pressure of water, that improvement which comprises introducing said substance to be solidified into a chamber while maintaining a vacuum in said chamber so extremely high as to provide an extremely low vapor pressure of water and to effect subdividing and freezing of the substance into solidified porous particles containing frozen liquid, agitating particles of solid porous frozen substance while maintaining the said vacuum and supplying external heat from a body to said solid frozen particles in amounts sufficient to substantially dehydrate said solid frozen particles without substantially melting said solid frozen particles and finally removing the solid dehydrated particles from the vacuum chamber while continuing to maintain said vacuum.

21. A method of freeze-drying an organic-containing substance which substance is of a liquid to semi-solid nature and contains at least both one volatile and non-volatile constituent at the temperature and pressure of freezing, the steps which include introducing said substance in a solid frozen condition into a chamber having a vacuum so extremely high as to provide extremely low vapor pressure of water and to at least partially dehydrate said solid substance, causing a continuous flow of said substance in a solid frozen form through a treating zone, maintaining a vacuum during its progress through said zone, and agitating the aforesaid frozen substance during its progress through said zone while in contact with a heated surface to effect removal of vapor of said liquid from said solid substance to produce solid, porous, substantially dry particles containing only a minor amount of said liquid, continuing the aforesaid steps to keep said particles in a frozen condition to effect the removal of controlled amounts of vapor of the frozen liquid from said substance by vaporization whereby said substance is converted into dehydrated solid particles containing only minor amounts of said liquid, and finally removing the solid particles from the vacuum chamber while maintaining the vacuum in said chamber.

THEODORE R. FOLSOM.